US010075598B2

(12) United States Patent
Romanoff et al.

(10) Patent No.: US 10,075,598 B2
(45) Date of Patent: Sep. 11, 2018

(54) SHEET SCANNER WITH SWIPE SCREEN INTERFACE WITH LINKS TO MULTIPLE STORAGE DESTINATIONS FOR SCANNED ITEMS

(71) Applicant: The Neat Company, Inc., Philadelphia, PA (US)

(72) Inventors: Harris Romanoff, Bala Cynwyd, PA (US); Ravi Shankar Venkata Dwivedula, Bensalem, PA (US)

(73) Assignee: The Neat Company, Inc., Philadelphia, PA (US)

( * ) Notice: Subject to any disclaimer, the term of this patent is extended or adjusted under 35 U.S.C. 154(b) by 0 days.

(21) Appl. No.: 13/972,473

(22) Filed: Aug. 21, 2013

(65) Prior Publication Data

US 2015/0055197 A1 Feb. 26, 2015

(51) Int. Cl.
*H04N 1/00* (2006.01)
(52) U.S. Cl.
CPC ..... *H04N 1/00225* (2013.01); *H04N 1/00228* (2013.01); *H04N 1/00411* (2013.01); *H04N 1/00474* (2013.01); *H04N 1/00482* (2013.01); *H04N 2201/0039* (2013.01); *H04N 2201/0055* (2013.01)
(58) Field of Classification Search
CPC .. H04N 1/12; H04N 1/00225; H04N 1/00228; H04N 1/00411; H04N 1/00482; H04N 1/00474; H04N 2201/0055; H04N 2201/0039
USPC ........................................................ 358/1.15
See application file for complete search history.

(56) References Cited

U.S. PATENT DOCUMENTS

| 6,931,432 B1 * | 8/2005 | Yoshida ............. H04N 1/32117 358/1.15 |
| 7,069,240 B2 | 6/2006 | Spero et al. |
| 7,843,586 B2 | 11/2010 | Ferlitsch |
| 8,279,479 B2 | 10/2012 | Dowling et al. |
| 8,477,392 B2 | 7/2013 | Saida |

(Continued)

FOREIGN PATENT DOCUMENTS

WO WO-2015027020 2/2015

OTHER PUBLICATIONS

"International Application Serial No. PCT/US2014/052012, International Preliminary Report on Patentability dated Mar. 3, 2016", 7 pgs.

(Continued)

*Primary Examiner* — Bharatkumar S Shah
(74) *Attorney, Agent, or Firm* — Schwegman Lundberg & Woessner, P.A.

(57) ABSTRACT

A sheet scanner that scans an input document to generate a scan image that is communicated to a selected scan destination via a wireless communications port of the sheet scanner includes a touch screen display having a swipe screen interface including at least one icon for selecting a scan destination by selecting the icon on the touch screen display, and at least one icon that the user may access by swiping the swipe screen interface and that, when selected, enables the user to select a different scan destination. An outbox icon may also be selected to enter the sheet scanner into a mode for viewing activity status and history of the sheet scanner and for resending the scan image to the same or a new scan destination.

19 Claims, 13 Drawing Sheets

(56) References Cited

U.S. PATENT DOCUMENTS

| | | | |
|---|---|---|---|
| 2001/0055978 A1* | 12/2001 | Herrod | G06F 1/1626 |
| | | | 455/517 |
| 2005/0080844 A1* | 4/2005 | Dathathraya | H04N 1/00222 |
| | | | 709/201 |
| 2008/0168024 A1 | 7/2008 | Petty | |
| 2008/0174806 A1* | 7/2008 | Singh | G06F 17/30011 |
| | | | 358/1.15 |
| 2009/0231637 A1 | 9/2009 | Kemmochi et al. | |
| 2011/0084925 A1* | 4/2011 | Baik | G06F 3/04817 |
| | | | 345/173 |
| 2012/0019863 A1* | 1/2012 | Sensu | H04N 1/0044 |
| | | | 358/1.15 |
| 2013/0038904 A1* | 2/2013 | Dowling et al. | 358/1.15 |
| 2013/0100059 A1* | 4/2013 | Champion | G06F 3/0488 |
| | | | 345/173 |
| 2013/0103582 A1 | 4/2013 | Singfield | |
| 2013/0169549 A1 | 7/2013 | Seymour et al. | |
| 2014/0029067 A1 | 1/2014 | Dwivedula et al. | |

OTHER PUBLICATIONS

"International Application Serial No. PCT/US2014/052012, International Search Report dated Mar. 23, 2015", 2 pgs.
"International Application Serial No. PCT/US2014/052012, Written Opinion dated Mar. 23, 2015", 5 pgs.

\* cited by examiner

Set Up Workflow

SHEET SCANNER WITH SWIPE SCREEN INTERFACE WITH LINKS TO MULTIPLE STORAGE DESTINATIONS FOR SCANNED ITEMS

TECHNICAL FIELD

The disclosed invention relates to a sheet scanner and, more particularly, to a sheet scanner having a swipe screen interface that provides links to multiple storage destinations for the scanned items whereby the user of the sheet scanner may designate and change the storage destination(s) of the scanned items by simply swiping to an icon representing the desired storage destination(s).

BACKGROUND

Portable document scanners for capturing images of documents such as receipts and forwarding such images to a computer processor for processing are known in the art. For example, U.S. Pat. No. 7,069,240 assigned to the present assignee discloses a system including an image capture device, such as a portable document scanner or digital camera, that is connected to a computer processor that captures and stores the images, analyzes the images, converts the images to text, analyzes the data, and, in the event of expense data, puts the data into an expense report. The images may be uploaded via the Internet or an intranet to another network such as the cloud for remote data storage. Such a system has been shown to profoundly improve the processing of receipts and to expedite the generation of expense reports and the like.

In the case of remote storage of the scanned data, as in the cloud, for example, it is desired to provide a mechanism to send the scanned data directly to the remote storage destination with minimal effort by the user. For example, it is desired to enable the user to designate the remote storage destination without having to access a related computer to process the scanned data to identify remote storage destinations. It is desired to make this process much easier for the user by enabling the user to interact directly with the document scanner to designate where the scanned data is to be stored and to use Internet connectivity of the document scanner to directly facilitate the storage operation. The present invention addresses these and other needs in the art.

SUMMARY

The above and other needs in the art are addressed by a sheet scanner having a swipe screen interface that provides links to multiple storage destinations for the scanned items whereby the user of the sheet scanner may simply swipe an icon representing the desired storage destinations on the swipe interface to select and send the scanned data to the desired storage destinations.

The sheet scanner of an exemplary embodiment includes an image scanner that scans an input document to generate a scan image, a processor, a wireless communications port that enables wireless communications with remote computing services, a touch screen display, and a memory that stores instructions for execution by the processor. In the exemplary embodiment, the instructions include instructions that, when processed, cause the processor to present a swipe screen interface to the display that includes at least one icon that, when selected on the touch screen display, specifies a scan (storage) destination, and at least one icon that, when selected on the touch screen display, enables a user to change to a different scan destination known to the sheet scanner for storing the scan image. Once the scan destination is selected, the processor communicates the scan image to the selected scan destination via the wireless communications port. The swipe screen interface also includes at least one icon that, when selected, enables the user to add a new scan destination previously unknown to the sheet scanner. The sheet scanner also includes an update feature whereby new scan destinations are provided to the sheet scanner from a remote server as such new scan destinations become available.

The screen interface may be used for other local processing features as well. For example, the swipe screen interface further includes at least one scan setting icon for selecting a scan setting to be adjusted by selecting the scan setting icon on the touch screen display. Sample scan setting icons include icons that permit the user to select at least one of color mode, single sided scanning, double sided scanning, separate or combined mode, DPI resolution, and image format. The selected scan settings may be applied to scanned documents across different scan destinations or the selected scan settings may be saved separately in the memory and associated with separate scan destinations.

The swipe screen interface is adapted to provide visual feedback to the user that is associated with the selected scan destination icon upon insertion of paper into the sheet scanner. For example, an arrow may point from the scan button to the selected scan destination icon on the touch screen display.

The swipe screen interface is also adapted to provide a feature whereby a user may select an outbox icon to enter the sheet scanner into a mode for viewing activity status and history of the sheet scanner. The swipe screen interface also enables the user to choose to re-send previously scanned images to the same scan destination as previously sent or to one or more other scan destinations. Also, once the document has been scanned, the scan image may be displayed on the touch screen display for review and/or editing by the user before the scan image is communicated to the selected scan destination.

The swipe screen interface further displays the status of the uploading or local saving of the scan image on the touch screen display. Also, memory management software automatically manages the memory such that the oldest saved scan images that have been successfully uploaded or saved to their selected scan destination are automatically deleted from the memory to make room for new scan images.

The invention also includes associated methods of scanning a document. For example, a scanning method in accordance with exemplary embodiments includes the steps of selecting a scan destination for a document scanned by an image scanner by swiping a swipe screen interface of a touch screen display of the image scanner between icons representing respective scan destinations and selecting an icon to select a scan destination, scanning the document with the image scanner to generate a scan image, and communicating the scan image to the selected scan destination via a wireless communications port of the image scanner by, for example, uploading to a remote scan destination, FTP transfer, or email. The user may also add a new scan destination previously unknown to the sheet scanner by selecting a new scan destination icon and entering data representative of the new scan destination into the sheet scanner via the touch screen interface. In addition, new scan destinations and icons for same may be downloaded from a remote server via the wireless communications port.

The exemplary methods also include the steps of selecting a scan setting to be adjusted by selecting a scan setting icon on the swipe screen interface of the touch screen display. Such scan settings may include at least one of color mode, single sided scanning, double sided scanning, separate or combined mode, DPI resolution, and image format that are selected by selecting a corresponding scan setting icon on the swipe screen interface of the touch screen display. The user may also select a mode that enables viewing activity status and history of the sheet scanner by selecting an outbox icon on the swipe screen interface of the touch screen display and resending the scan image to the selected scan destination or to a new scan destination. Also, the exemplary methods may include displaying the scan image on the touch screen display for review and/or editing by the user.

BRIEF DESCRIPTION OF THE DRAWINGS

The above-mentioned and other features and advantages of the invention will be become apparent from the following description in conjunction with the attached figures, of which.

DETAILED DESCRIPTION OF ILLUSTRATIVE EMBODIMENTS

Exemplary embodiments of the invention will be described in detail below with reference to FIGS. 1-11. Those skilled in the art will appreciate that the description given herein with respect to those figures is for exemplary purposes only and is not intended in any way to limit the scope of the invention. All questions regarding the scope of the invention may be resolved by referring to the appended claims.

Figure 1:
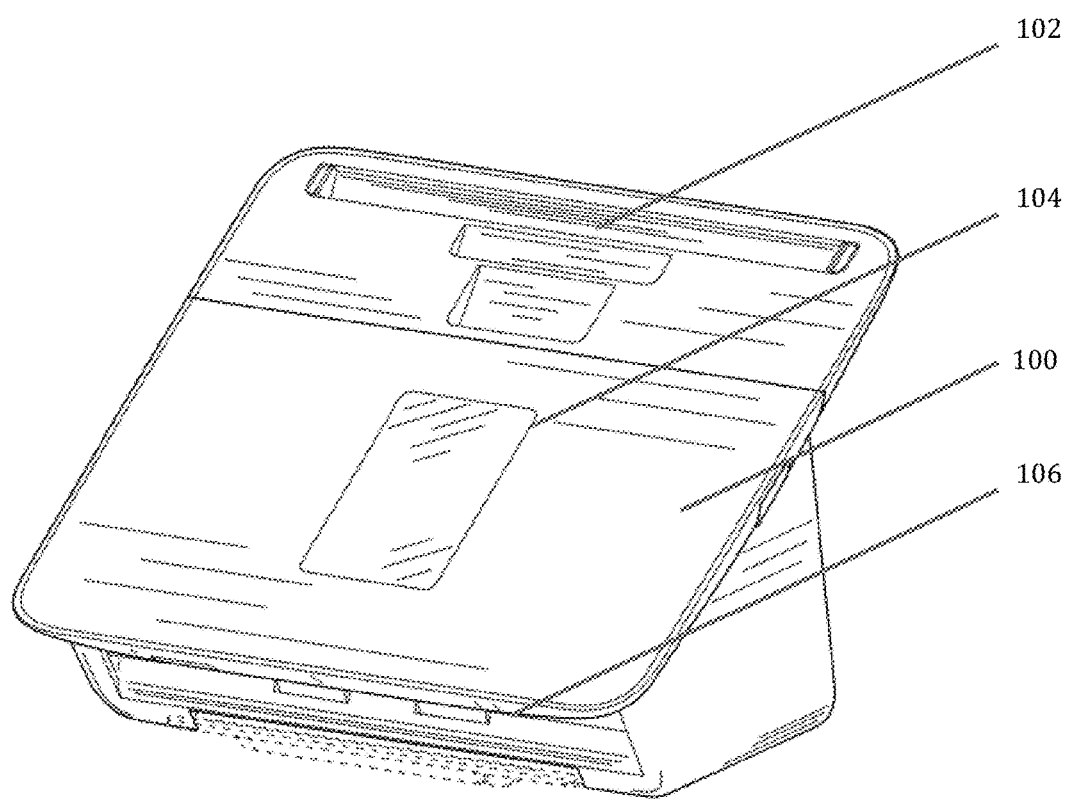
FIG. 1 illustrates a standalone sheet scanner adapted to include a swipe screen interface in accordance with the invention.

FIG. 1 illustrates a standalone document or sheet scanner 100 (battery and/or AC powered) adapted to include a swipe screen interface in accordance with the invention. The sheet scanner 100 includes an input tray 102 for accepting one or more papers for scanning and an internal feed motor (not shown) that feeds papers from the input tray 102 into the image capture hardware for conversion into digital images. The sheet scanner 100 also includes integrated wireless connectivity and an integrated touchscreen 104 that presents the user with the ability to adjust scan settings, choose scan (storage) destinations, initiate scans, and the like as described below with respect to FIGS. 2-11. In an exemplary embodiment, the integrated touchscreen 104 can be resistive, capacitive or employ a similar technology to enable touchscreen interaction. The integrated touchscreen 104 displays the scanned documents as digital images and also displays the swipe screen interface of the invention as described in more detail below. Finally, the scanned document exits the sheet scanner 100 through the exit tray 106.

Figure 2A:
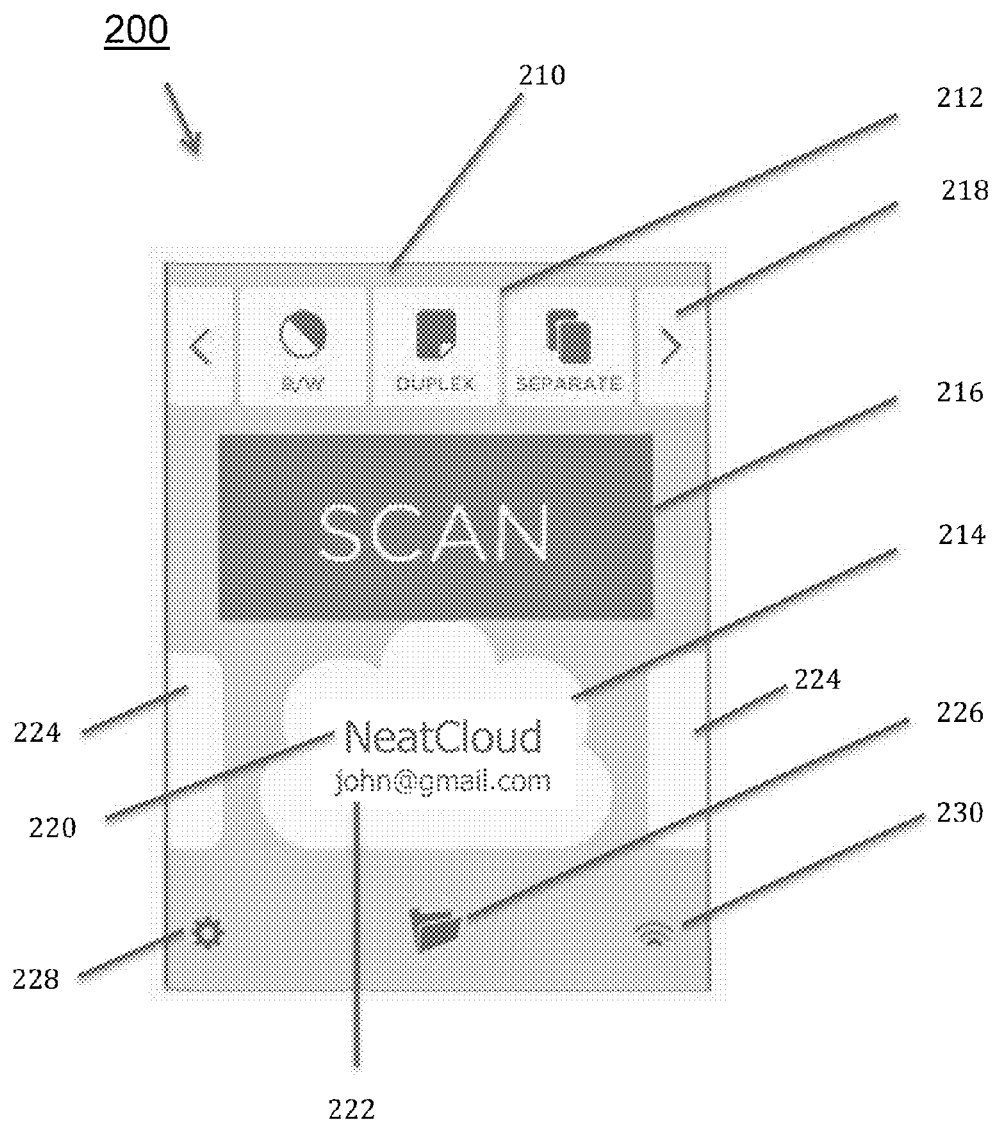
FIG. 2A illustrates an exemplary swipe screen interface in accordance with the invention.

FIG. 2A illustrates an exemplary swipe screen interface 200 in accordance with the invention. As illustrated, the home screen 210 of the swipe screen interface 200 includes at least three elements for selection by the user: Adjust Scan Settings 212, Selecting Scan Destination 214, and Initiate a Scan 216. Adjust Scan Settings 212 includes, but is not limited to, selection of color mode, single (simplex) scanning, double (duplex) sided scanning, separate or combined mode, DPI resolution (e.g., 300 DPI), and image format (e.g., PDF) among other common settings. Additional scan settings can be accessed by swiping or clicking to a second menu of scan settings 218. Scan settings 212 by default are global in scope—i.e. they are applied consistently across different scan destinations 214. However, as explained below with respect to FIG. 3, users can adjust scan settings separately by scan destination by selecting the settings screen icon 228 and toggling ON the button for Settings Are Destination Specific 350. When button 350 is ON, each scan destination 214 associates a memory ID value with a stored set of scan settings. On the other hand, when the sheet scanner 100 is connected directly to a host PC via USB cable, if the user chooses the host PC as the scan destination ("Computer" 490 in FIG. 4B), then the scan settings on the sheet scanner 100 are hidden as the sheet scanner 100 becomes slave to the settings specified on the host PC.

Figure 4A:
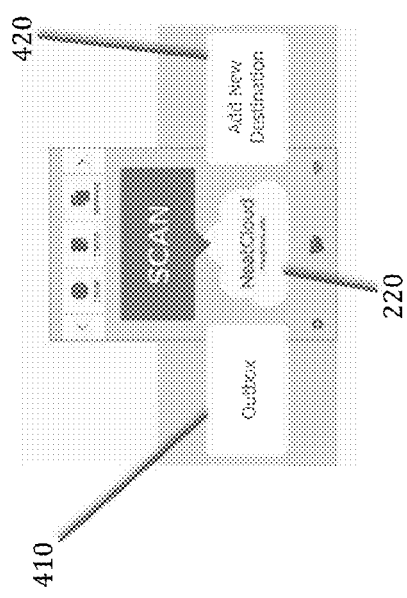
FIG. 4A illustrates an initial selection ribbon of scan destinations for the scanned data in accordance with the exemplary embodiment.
Figure 4B:
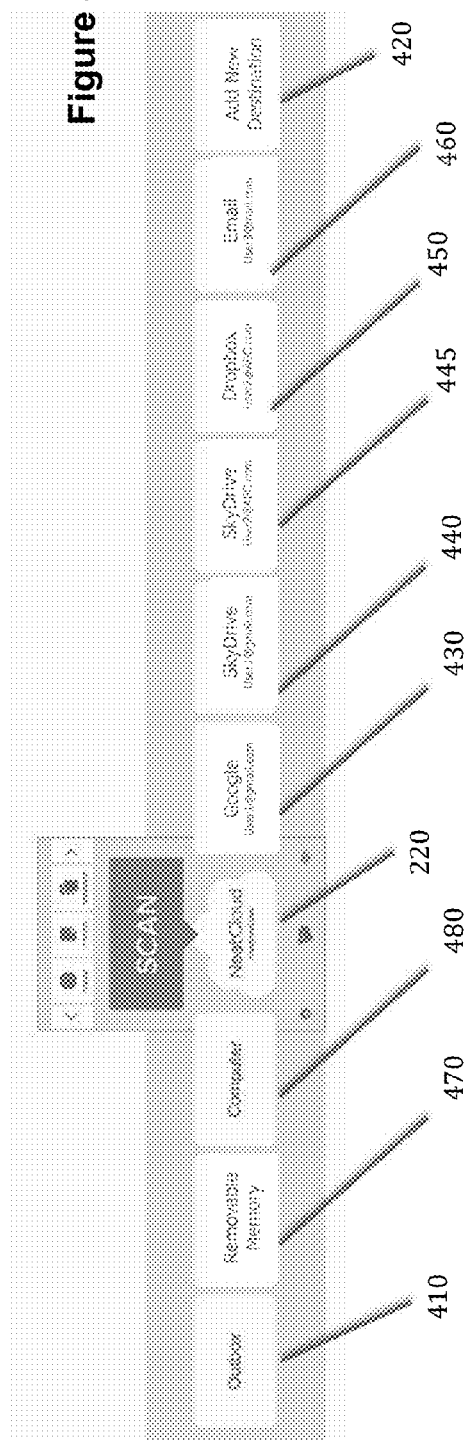
FIG. 4B illustrates a selection ribbon after additional scan destinations have been made available to the user of the sheet scanner.

The home screen 210 also displays available scan destinations 214 to the user in the form of a ribbon (see FIGS. 4A and 4B). Each scan destination in the ribbon of available scan destinations 214 displays its respective scan destination name 220 (e.g. NeatCloud, DropBox) and the authenticating login 222 or account name associated with that scan destination (e.g. john@gmail.com) for easy identification by the user. The user chooses a scan destination from the available scan destinations 214 by swiping left or right through scan destinations 214. The availability of additional scan destinations is visually indicated by the presence of an arrow or similar visual cue 224 indicating the presence of another scan destination that is off screen.

Finally, the home screen 210 further includes an Outbox icon 226 for one-touch access to Outbox 600 (FIG. 6), a Settings icon 228 for one-touch access to General Settings 300 (FIG. 3), and a wireless field strength indicator 230 for one-touch access to available wireless networks.

Figure 2B:
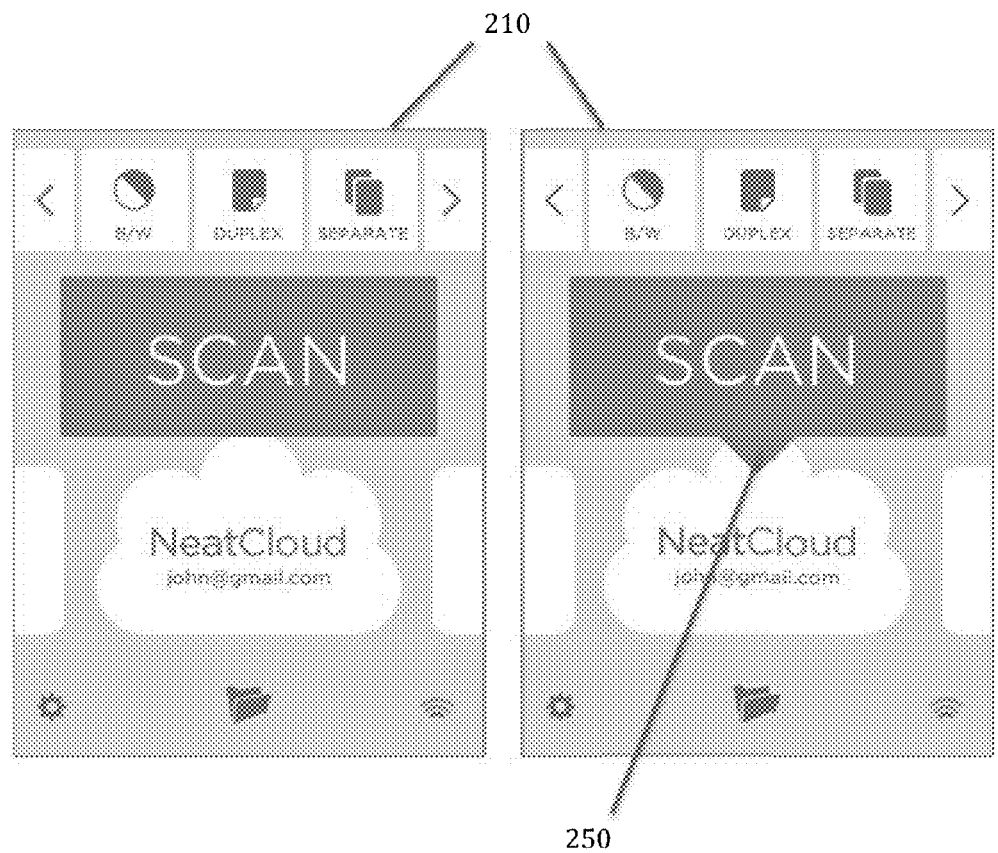
FIG. 2B illustrates the swipe screen interface of FIG. 2A after paper is detected in the input tray.

FIG. 2B illustrates the swipe screen interface of FIG. 2A after paper is detected in the input tray. As depicted in FIG.

2B, when paper is detected in input tray 102, home screen 210 displays an arrow 250 between scan button 216 and scan destination 220. If the paper is removed, the arrow 250 disappears. In this way, the arrow serves the dual purpose of providing real-time visual feedback to the user that paper is detected and the selected scan destination of the paper being scanned.

Figure 3:
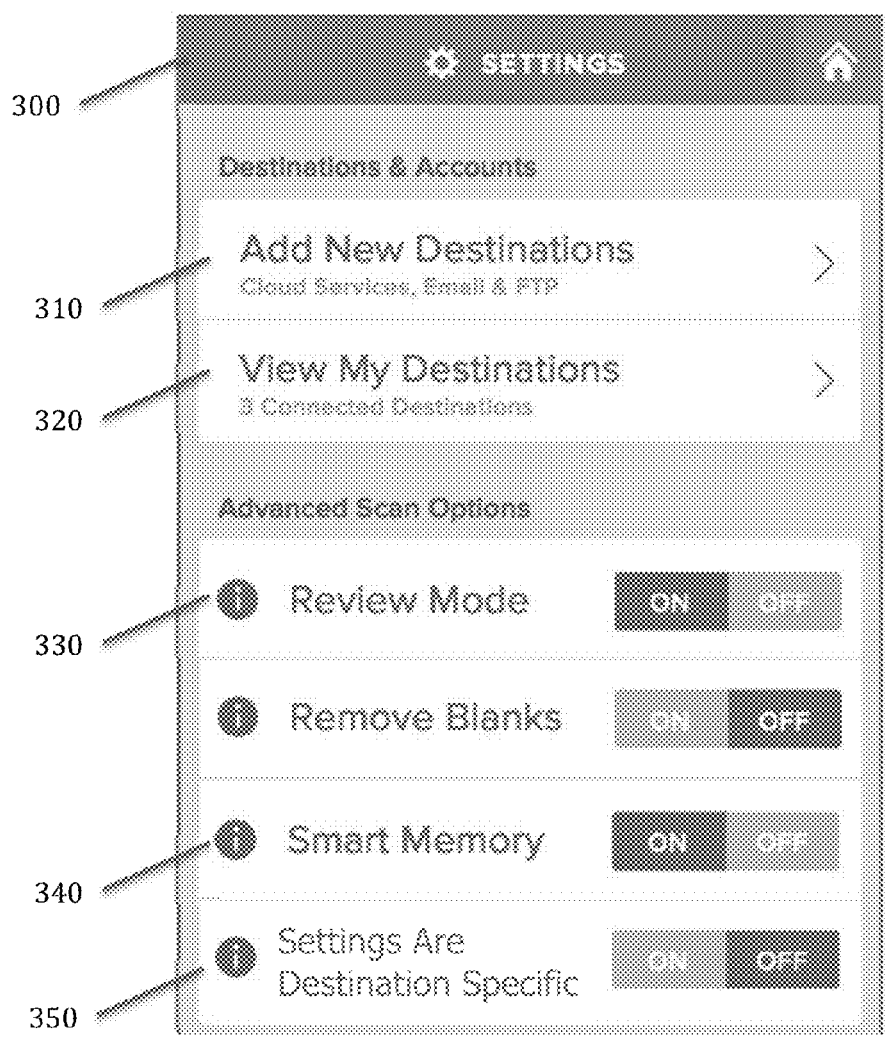
FIG. 3 illustrates the settings menu obtained when the settings icon of FIGS. 2A and 2B is selected.
Figure 5:
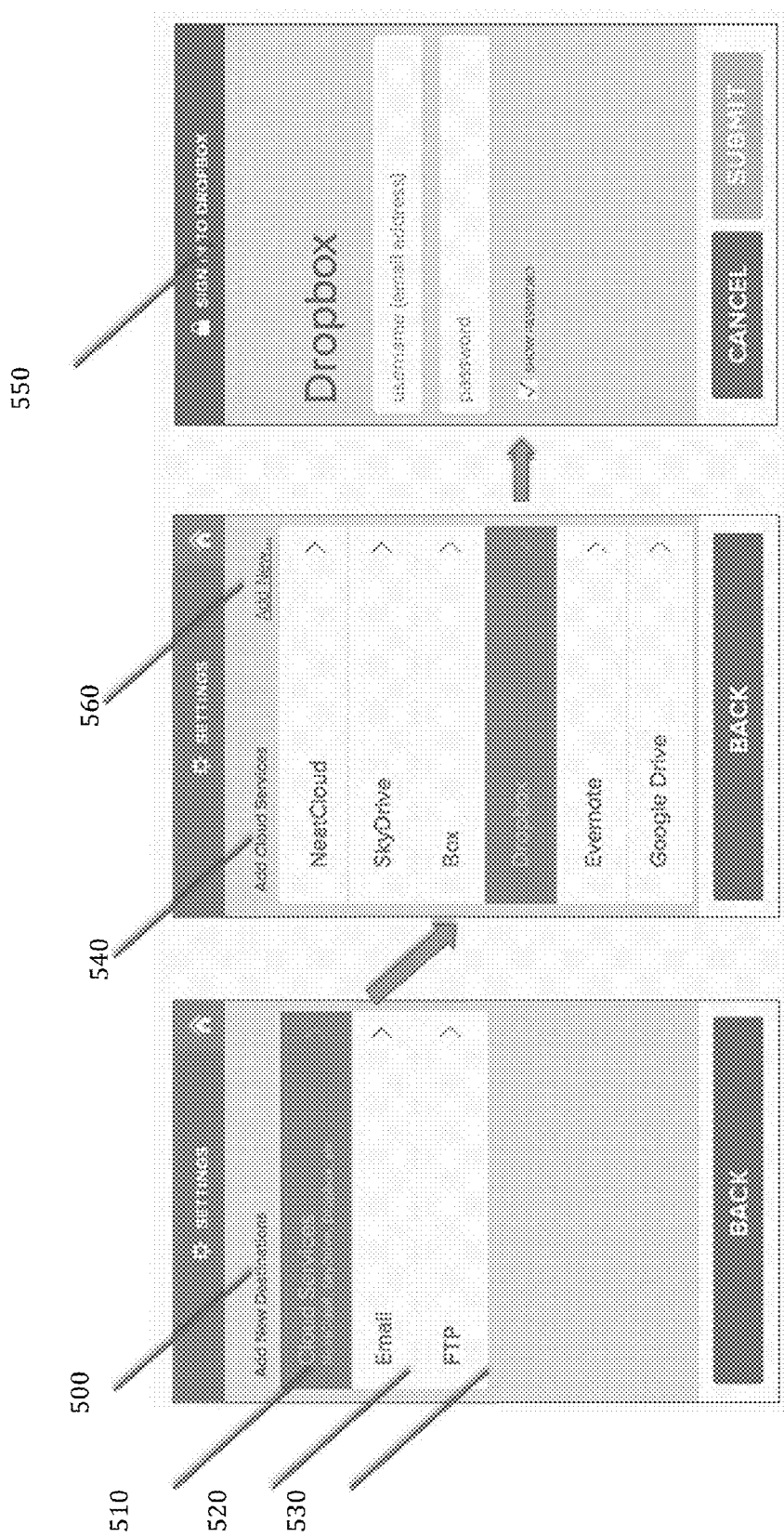
FIG. 5 illustrates interface screens on the swipe screen interface for adding new scan destinations for the scanned data in accordance with the exemplary embodiment.
Figure 6:
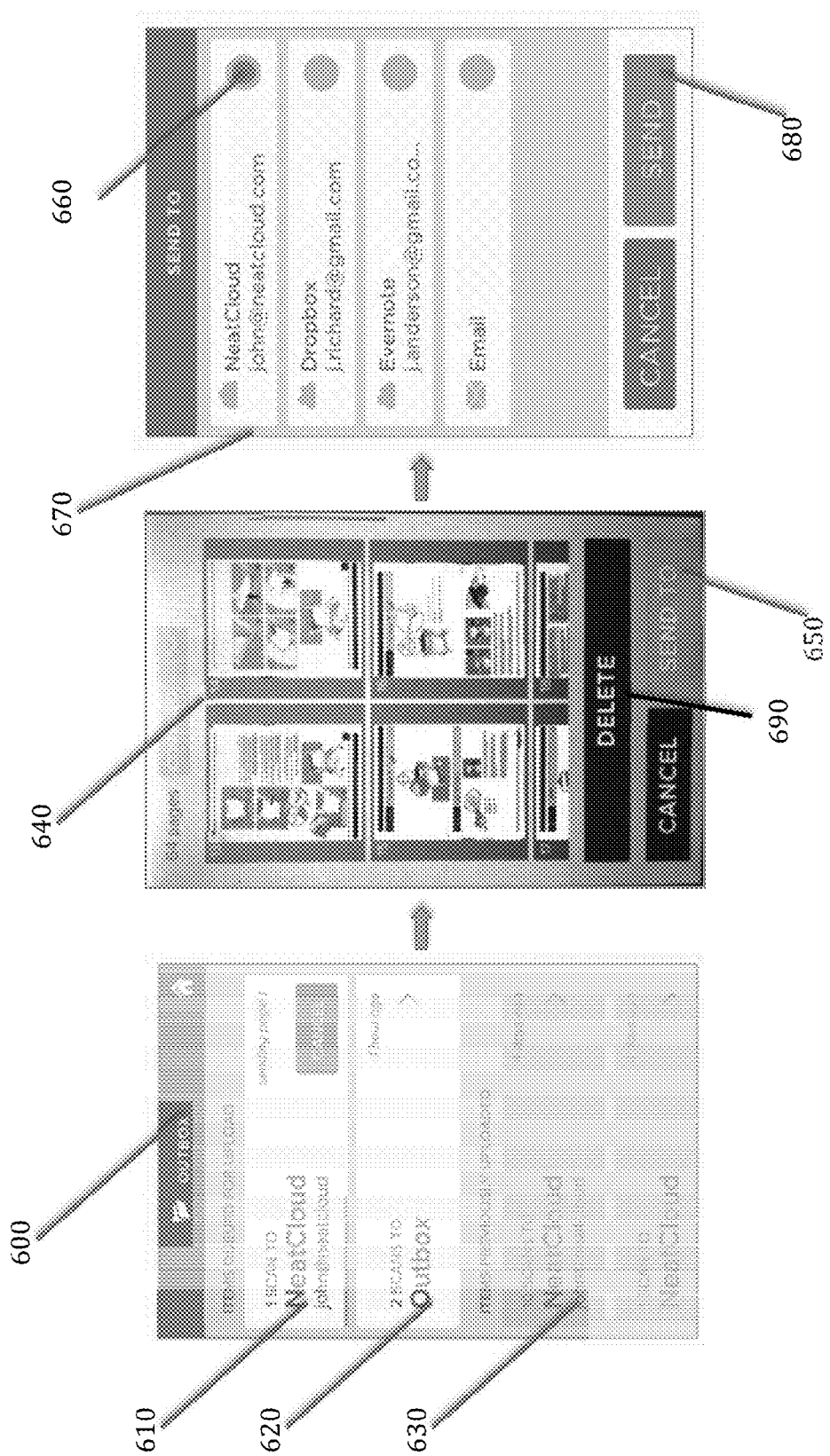
FIG. 6 illustrates interface screens on the swipe screen interface for viewing scanning activity status and history in the outbox of the sheet scanner and re-sending scans to the same or other scan destinations.

FIG. 3 illustrates the settings menu 300 obtained when the settings icon 228 of FIGS. 2A and 2B is selected. As illustrated, the user may add new scan destinations by selecting Add New Destinations 310 (FIG. 5) or may view existing scan destinations by selecting View My Destinations 320 (FIG. 6). The user may also select any of a number of options including Review Mode 330 (FIG. 9), Smart Memory (memory management) 340 (FIG. 10), or Settings Are Destination Specific 350. Of course, other advanced scan options or scan destination and accounts options may also be provided by those skilled in the art as desired.

FIG. 4A illustrates an initial selection ribbon of scan destinations for the scanned data in accordance with the exemplary embodiment. More specifically, FIG. 4A depicts the availability of two scan destinations: NeatCloud 220 and Outbox 410. In addition, Add New Destination 420 provides one-touch access to Add New Destination screen 500 (FIG. 5), which saves the user the step of needing to first tap into General Settings 300 and then tap Add New Destinations 310.

FIG. 4B demonstrates a selection ribbon including an exemplary grouping of additional scan destinations that may be made available to a user of the sheet scanner 100 through user selection and/or automatic download. More specifically, FIG. 4B depicts the availability of seven additional scan destinations compared to FIG. 4A. A cloud service Google (User1@gmail.com) 430 is available as a cloud destination to User1@gmail.com. A second cloud service SkyDrive (User1@gmail.com) 440 is available as a second cloud destination for the same user (User1@gmail.com). The same cloud service (SkyDrive) is also available to a second user SkyDrive (User2@ABC.com) 445. A third cloud service DropBox (User2@ABC.com) 450 is available to the second user. Email (User3@mail.com) 460 is available as an email destination to a third user. Users choose and authenticate scan destinations to add by selecting Add New Destinations 420, which takes the user to Add New Destinations screen 500 (FIG. 5). FIG. 4B also depicts non-cloud destinations: Removable Memory 470 and Computer 480. Removable Memory 470 is automatically added to the ribbon as an available scan destination upon the user inserting into sheet scanner 100 a digital memory card (e.g. SD, USB Stick), while computer 480 is automatically added to the ribbon as an available scan destination upon the user connecting sheet scanner 100 to a computer (e.g. Windows PC) via a USB cable.

Figure 4C:
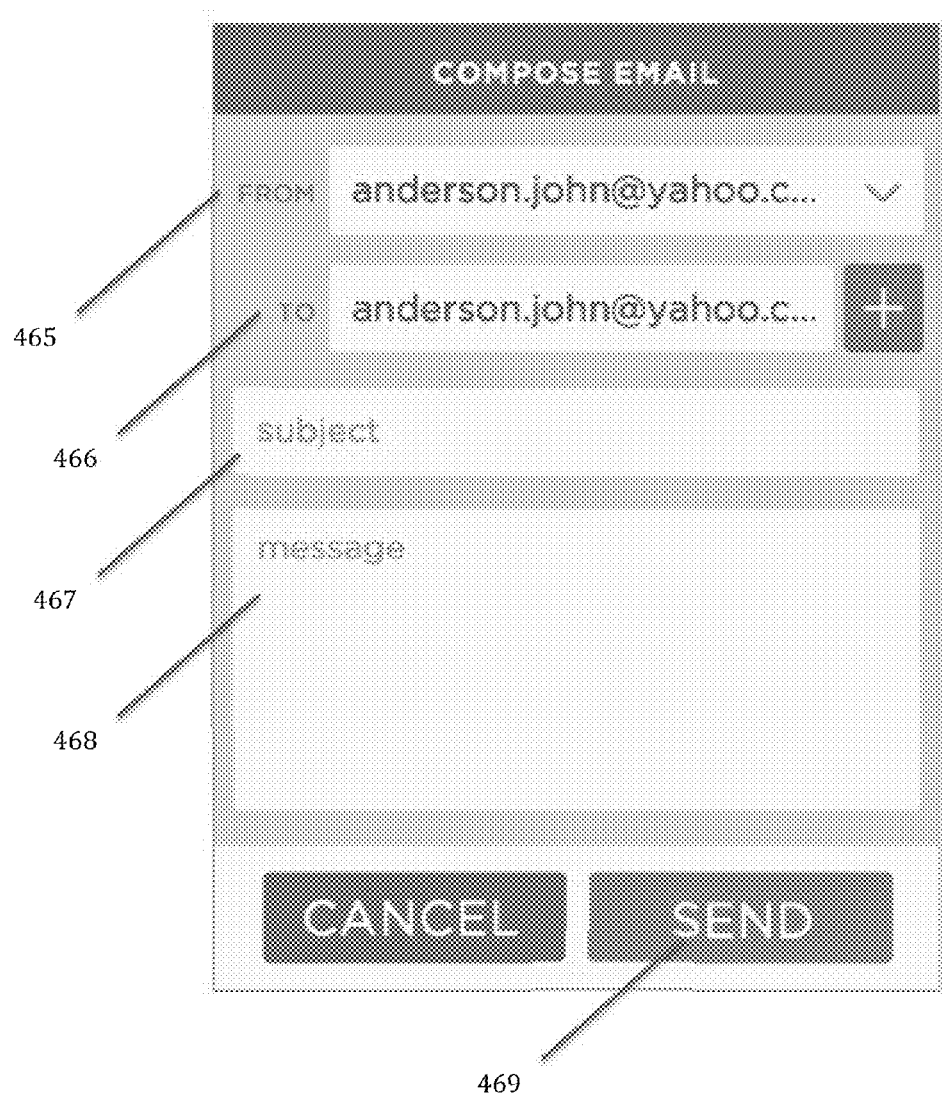
FIG. 4C illustrates an interface screen for composing an email for sending a scanned document via email in accordance with the exemplary embodiment.

When email is chosen as a scan destination at 460, the user is presented with a screen such as that depicted in FIG. 4C. The purpose of this screen is to allow the user to input a recipient email address 466, input a subject 467 and input a message 468. Upon clicking Send 469, the scanned images are emailed to the designated recipient. It is important to note that the scans will appear to the recipient as having come directly from the sender's email address 465, and the scanned images will appear in the sender's sent email folder.

FIG. 5 illustrates interface screens on the swipe screen interface 200 for either choosing existing scan destinations known to the sheet scanner 100 to authenticate into or for adding new scan destinations (unknown to the sheet scanner 100) for the scanned data in accordance with the exemplary embodiment. Specifically, as shown in FIG. 5, on Add New Destinations 500, cloud destinations known to the sheet scanner 100 may be added by tapping Cloud Services 510, Email destinations are added by tapping Email 520, and FTP destinations are added by tapping FTP 530. For example, if Cloud Services 510 is selected, existing cloud services to add (540) will be displayed to the user. On choosing a service (e.g., DropBox), the user then authenticates to that service at 550. The sheet scanner 100 then encrypts and stores the authentication credentials so that the user does not need to re-credential for each scan to that scan destination. A similar process is employed for configuring the sheet scanner 100 with the ability to scan directly to someone's email address 520 or to FTP 530 among other popular networking storage destinations.

FIG. 5 also depicts that a user can choose to add a new scan destination unknown to the sheet scanner 100 via Add New 560 which enables the user to add a less common service that is not otherwise available in Add Cloud Services 540 by entering data representative of the new scan destination into the sheet scanner via the touch screen interface. Alternatively, because the device's firmware can be remotely updated (FIG. 7) by periodically pinging server 760 to see if there is a newer version and then presenting the user the option to download and apply that newer version, additional scan destinations and services can automatically be made available to users and populated into Add Cloud Services 540.

Upon authenticating a new scan destination or inserting Removable Memory 470, that scan destination is automatically selected as the active scan destination on Home Screen 210. Scan destinations are added to the ribbon by default based on the order they are added but the user can adjust the order of the scan settings through General Settings 300 (FIG. 3).

FIG. 6 illustrates Outbox screens on the swipe screen interface 200. The Outbox 600 provides three capabilities to the user in an exemplary embodiment. First, the Outbox 600 provides a means to view upload status. Specifically, the user can view scans that are actively uploading to their scan destination 610 and scans that are queued for upload 620. Scans queued for upload 620 are typically in this state as a result of a network connection not being present or scan destination credentials needing to be corrected. If such error conditions exist, the scans queued for upload 620 and/or the noted errors are communicated to the user so the user can take corrective actions to rectify. Second, the Outbox 600 provides a means to view a running history of recent scans. Specifically, the user can view a log of recent scans 630. Scans that are queued for upload 620 or recent scans 630 can be retrieved for viewing again in interface 640. Third, scans can either be resent to the same scan destination or sent to one or more additional scan destinations by selecting "send to" button 650 and then selecting one or more destinations 660 from the list of available scan destinations at 670. This capability is particularly useful for users who need to send a copy of a scanned document to another user or scan destination without having to rescan the original documents. Upon making this selection, the sheet scanner 100 will send the images to the scan destinations specified upon the user tapping Send 680. The user may also manually delete previous scans by selecting the scan images and then pressing the delete button 690.

Figure 7:
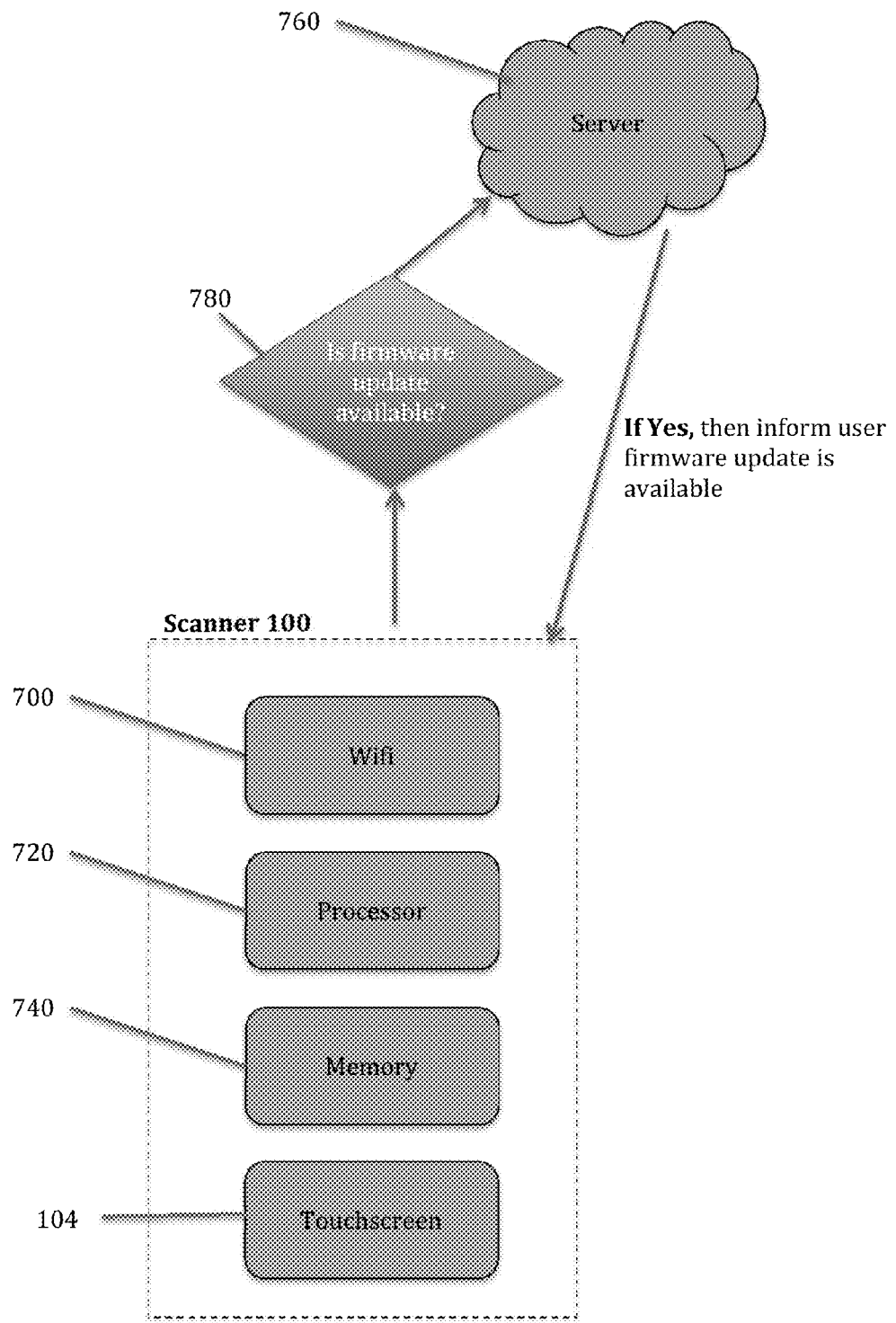
FIG. 7 illustrates the process of automatically updating the firmware of the sheet scanner from a remote server.

FIG. 7 illustrates the process of updating the firmware of the sheet scanner in the exemplary embodiment. As noted above with respect to FIG. 5, the available cloud services 540 and other services available to the user in sheet scanner 100 may be periodically updated and downloaded to the sheet scanner 100 via the integrated wireless interconnectivity (e.g., Wi-Fi) 700 of the sheet scanner 100. As illustrated, sheet scanner 100 includes processor 720 that performs the processes described herein by processing instructions stored in memory 740 and displaying the swipe screen interface 200 on the touchscreen 104 as described above. Processor 720 also periodically pings server 760 via Wi-Fi 700 at 780 to determine if there is a newer version of any of the firmware and connectivity data stored in the memory 740 and then presents the user the option to download and automatically apply that newer version, additional scan destinations and services so that the updates may be made available to users of the sheet scanner 100.

Software stored in a memory 740 and loaded onto a processor 720 of the sheet scanner 100 control the operation of the swipe screen interface described above with respect to FIGS. 2-7. Operation of this software will be described below with respect to FIGS. 8-11.

Figure 8:
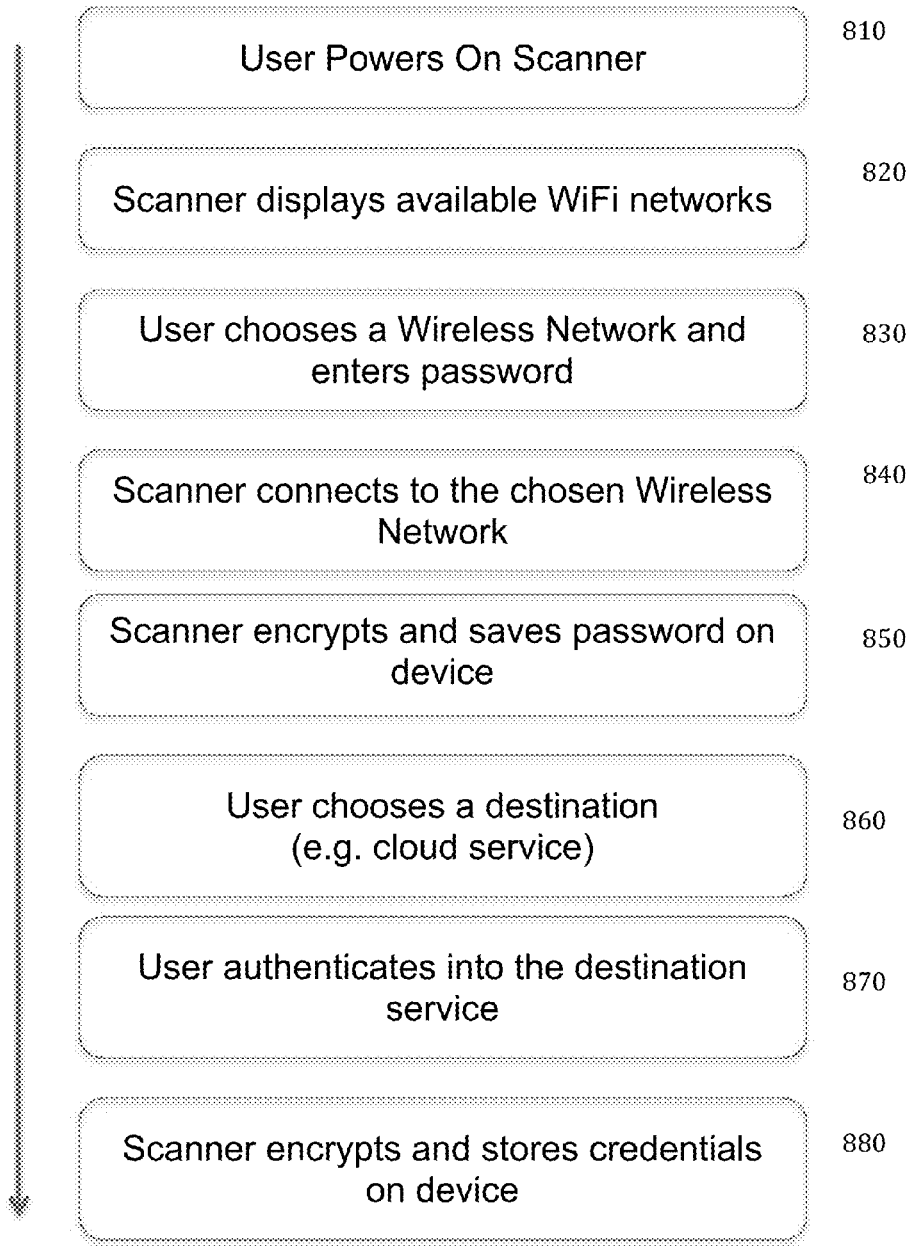
FIG. 8 illustrates an exemplary set up workflow of the sheet scanner in the exemplary embodiment.

FIG. 8 illustrates an exemplary set up workflow of the sheet scanner 100 in an exemplary embodiment. As illustrated, the user first powers on the sheet scanner 100 at 810, and the sheet scanner 100 displays a list of available Wi-Fi wireless networks at 820. The user then chooses a desired network and inputs a password to connect to it at 830. The sheet scanner 100 then connects to the chosen wireless network at 840 and encrypts and saves the password on the sheet scanner 100 at 850. When ready for a scan, the user then chooses a scan destination for the scanned data at 860 as described above with respect to FIG. 5. Upon choosing this scan destination, the user is prompted to authenticate into this scan destination at 870. The sheet scanner 100 then encrypts and saves the user's credentials on the sheet scanner 100 at 880. At each step of this flow, error handling may be provided such that the user can receive contextual feedback on issues. For example, if the user incorrectly credentials into the service at 870, the user is messaged that the credentials are incorrect and is re-presented with step 870.

Figure 9:
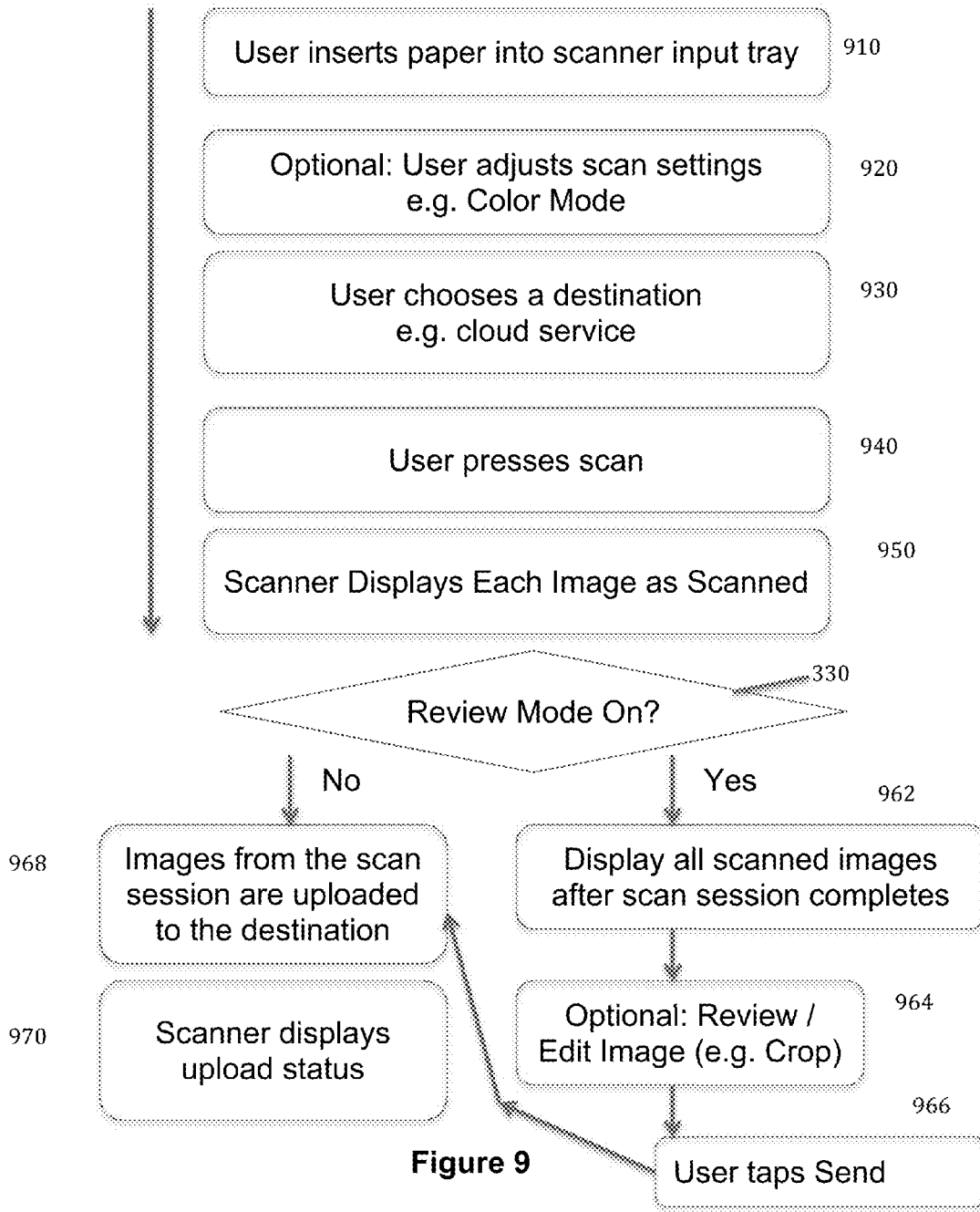
FIG. 9 illustrates an exemplary scan workflow of the sheet scanner in the exemplary embodiment.

FIG. 9 illustrates an exemplary scan workflow of the sheet scanner 100 in the exemplary embodiment. As illustrated, the user inserts paper to be scanned into the input tray 102 at 910. Optionally, the user can choose to adjust scan settings at 920, for example, gray-scale or color mode. If the user has not already done so, the user then chooses an existing scan destination or adds a new scan destination at 930 (e.g., NeatCloud 220). When ready, the user initiates the scan by clicking Scan button 216 (FIG. 2A) at 940. During the scanning process, each side of each page is briefly displayed on the screen 104 at 950 to provide visual feedback to the user on the quality of the scanned image.

If the user switches Review Mode 330 on under General Settings 300, all of the scanned images are displayed as a collection 962 immediately following completion of the scan session. Review Mode 330 enables the user to review each scan and, if desired, to edit the image at 964 by employing image functions such as autorotate, crop, delete, and the like. In an exemplary embodiment, such image functions include local image processing functions of the type described in U.S. patent application Ser. No. 13/952,264, filed Jul. 26, 2013, the contents of which are incorporated herein by reference. When the image is ready to send, the user taps Send at 966. The flow now proceeds from the same point forward as if the Review Mode 330 had initially been turned off. Namely, the images of the given scan session are all uploaded to the scan destination at 968. Throughout this process, the sheet scanner 100 provides real-time on-screen feedback to the user in form of status messaging such as 'uploading', 'completed' on screen 104 at 970.

It is important to note that unlike the steps of FIG. 8, the steps in FIG. 9 do not need to follow a particular order and in some cases can be skipped entirely. For example, the user can choose to skip step adjusting scan settings step 920 if the scan settings are already to the user's liking. Another example would be that the user adds the paper to be scanned into the sheet scanner 100 as the last step before clicking Scan at 940.

Figure 10:
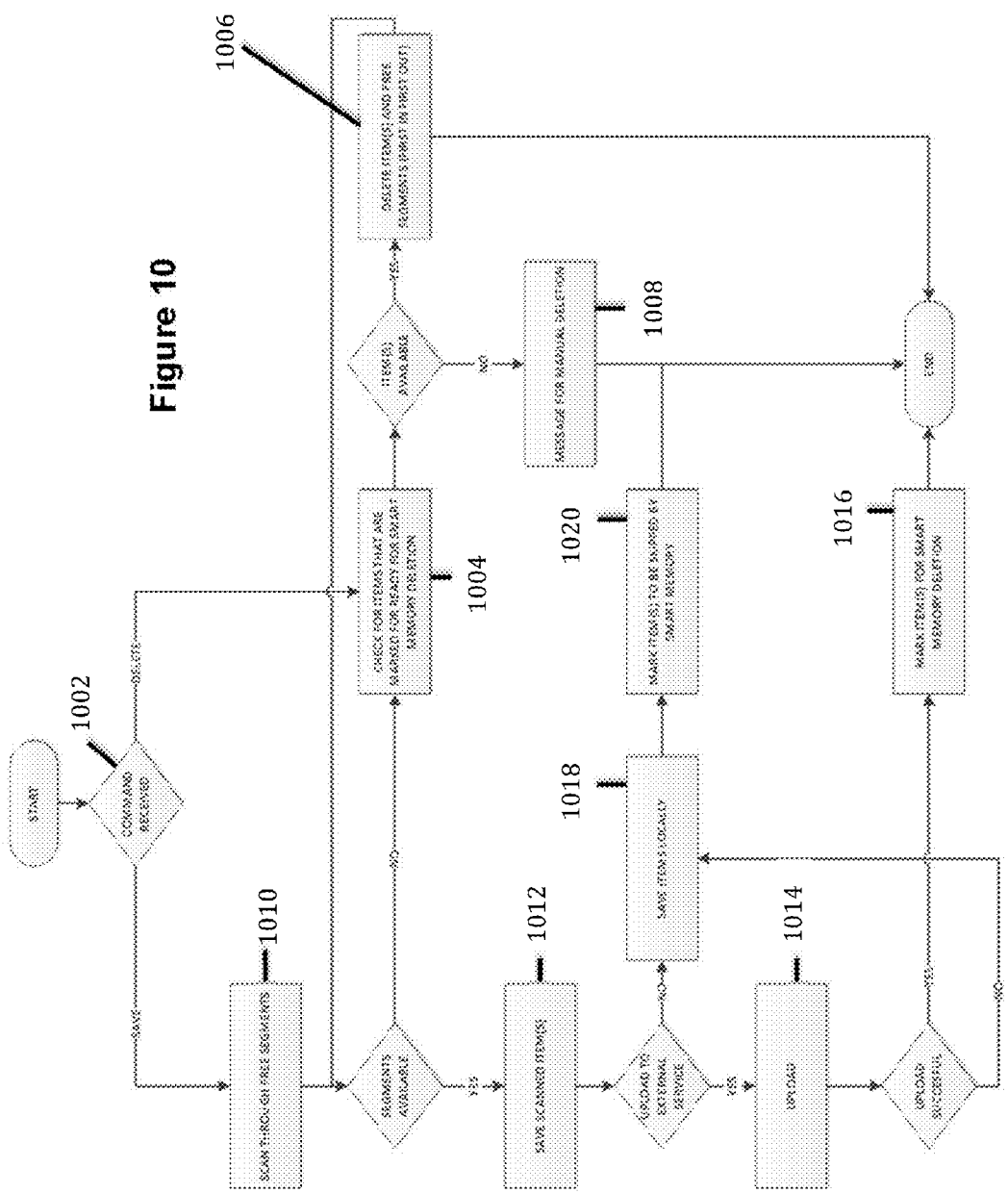
FIG. 10 illustrates an exemplary workflow of memory management software of the sheet scanner in the exemplary embodiment.

FIG. 10 illustrates an exemplary workflow of memory management software of the sheet scanner 100 in the exemplary embodiment. In particular, when Smart Memory 340 is ON (FIG. 3), Smart Memory 340 under General Settings 300 automatically manages onboard memory 740 (FIG. 7) so that the user does not need to. As depicted in FIG. 10, when a delete command is received at step 1002, Smart Memory 340 software checks for items in memory that are marked as ready for Smart Memory deletion at 1004. The oldest saved images in the memory 740 that have either been successfully uploaded or saved to their scan destination are automatically deleted from the memory 740 at 1006. If the images have not been successfully uploaded or saved to their scan destination, then the sheet scanner 100 displays messages on touchscreen display 104 at 1008 indicating that the user needs to resolve the issue or to manually delete existing images. If the user manually deletes existing images, that will free up segments of memory at 1010. On the other hand, when a save command is received at step 1002, Smart Memory 340 software scans through free segments of memory at 1010 and saves the scanned item(s) at 1012. If the scanned item(s) are to be uploaded to an external memory service, the scanned item(s) are uploaded at 1014 and, if the upload is successful, the corresponding items in memory 740 are marked at 1016 for Smart Memory deletion. On the other hand, if the upload is not successful, the scanned item(s) are saved locally at 1018 and marked at 1020 to be skipped by the Smart Memory process so that the scanned item(s) are not deleted at least until a successful upload has been completed. This process repeats periodically to continually free up memory space in memory 740 for storage of additional scan images.

Figure 11:
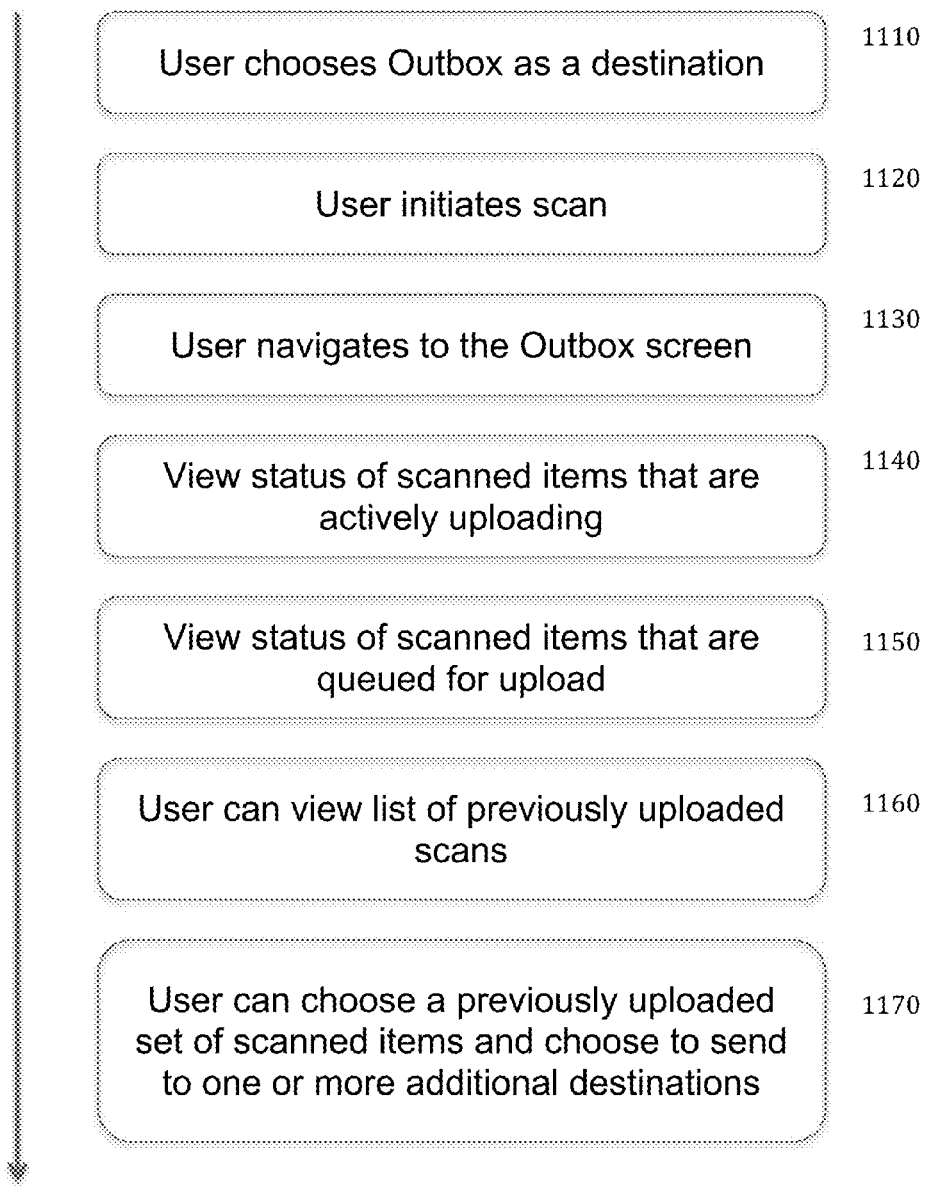
FIG. 11 illustrates an exemplary outbox workflow of the sheet scanner in the exemplary embodiment.

FIG. 11 illustrates an exemplary outbox workflow of the sheet scanner 100 in the exemplary embodiment. As illustrated, if the user is undecided on the scan destination, the user can choose to scan to the Outbox 600 as a scan destination at 1110 and then initiate the scan at 1120. At a future time, the user can then navigate to the Outbox screen (FIG. 6) at 1130 by navigating via the home screen 210 directly to the Outbox 600 by tapping icon 226 (FIG. 2A) or by tapping on Outbox 410 (FIG. 4A). Upon entering the Outbox 600, the user can view the status of scanned items that are actively uploading 610 at 1140, the status of items that are queued for upload (e.g. because Wi-Fi or the scan destination service is offline) 620 at 1150, or a list of previous scans that were successfully uploaded 630 at 1160. The user can then choose a set of previous scans to resend or to send to one or more additional scan destinations 670 at 1170 as described above with respect to FIG. 6.

Those skilled in the art will appreciate that the stored scan destinations include the IP address and/or any other information needed by the sheet scanner 100 to route the scanned data to the selected scan destination. This information is stored in the memory 740 of the sheet scanner 100 with the associated display icon 430, 440, etc. for that scan destination.

As is apparent from the above, all or portions of the various systems, methods, and aspects of the present invention may be embodied in hardware, software, or a combination of both. When embodied in software, the methods and apparatus of the present invention, or certain aspects or portions thereof, may be embodied in the form of program code (i.e., instructions). This program code may be stored on a computer-readable medium, such as a magnetic, electrical, or optical storage medium 740, including without limitation a floppy diskette, CD-ROM, CD-RW, DVD-ROM, DVD-RAM, magnetic tape, flash memory, hard disk drive, or any other machine-readable storage medium, wherein, when the program code is loaded into and executed by a machine, such as a computer or server, the machine becomes an apparatus for practicing the invention. A computer on which the program code executes will generally include a processor, such as processor 720, a storage medium readable by the processor 720 (including volatile and non-volatile memory and/or storage elements 740), at least one input device, and at least one output device. The program code may be implemented in a high level procedural or object oriented programming language. Alternatively, the program code can be implemented in an assembly or machine language. In any case, the language may be a compiled or interpreted language. When implemented on a general-purpose processor, the program code may combine with the processor to provide a unique apparatus or machine that operates analogously to specific logic circuits.

In the example embodiments described above, the processor 720 of the sheet scanner 100 is programmed by programming instructions stored in a suitable memory 740 that when executed by the processor 720 cause the processor 720 to perform the steps described above with respect to FIGS. 2-11. Of course, multiple memory elements may be used for storing the instructions and the scan images.

Those skilled in the art will appreciate that other features besides those specifically described herein may be used in a manner consistent with the techniques described herein. For example, the portable sheet scanner need not be a separate sheet scanner but may include a scanning application operating on a smart phone or other portable computing device for controlling scanning using a camera or Contact Image Sensor (CIS) of the smartphone or other portable computing device. "Sheet scanner" or "image scanner" as used herein thus includes such a scanning application in conjunction with a camera, CIS, or other device for capturing a digital representation of an object or document. Such variations are intended to be included within the scope of the invention as defined by the following claims.

What is claimed:

1. A sheet scanner comprising:
an image scanner that scans an input document to generate a scan image;
a processor;
a wireless communications port that enables wireless communications with remote computing services including cloud services;
a touch screen display; and
a memory that stores instructions for execution by the processor, the instructions including instructions that, when processed, cause said processor to present a swipe screen interface to said display, said swipe screen interface including a selection ribbon of icons of available scan destinations in the remote computing services including cloud services known to the image scanner for selection by a user whereby when an icon is selected on the touch screen display, a scan destination of the available scan destinations is specified for storing the scan image, said swipe screen interface further enabling the user to select a different scan destination by swiping the selection ribbon to present a different icon on the touch screen display that, when selected on the touch screen display, specifies the different scan destination for storing the scan image,
wherein the processor communicates the scan image to the selected scan destination via said wireless communications port,
wherein the selection ribbon further includes at least one scan setting icon for selecting a scan setting to be adjusted by selecting the scan setting icon on the touch screen display, the at least one scan setting icon including icons that permit the user to select at least one of color mode, single sided scanning, double sided scanning, separate or combined mode, DPI resolution, and image format, and
wherein the selection ribbon further includes at least one icon that, when selected, enables the user to add a new scan destination in the remote computing services including cloud services previously unknown to the image scanner for selection by entering via the touch screen display data representative of the new scan destination previously unknown to the image scanner.

2. The sheet scanner of claim 1, wherein the selected scan settings are applied to scanned documents across different scan destinations.

3. The sheet scanner of claim 1, wherein the selected scan settings are saved separately in said memory and associated with separate scan destinations by each scan destination associating a memory ID value with a stored set of destination specific scan settings.

4. The sheet scanner of claim 1, wherein upon the user inserting paper into the image scanner, the touch screen display provides visual feedback that is associated with the selected destination icon via the swipe screen interface.

5. The sheet scanner of claim 1, wherein said selection ribbon further includes an outbox icon for selection by the user, wherein selection of the outbox icon enters the image scanner into a mode for viewing activity status and history of the image scanner.

6. The sheet scanner of claim 1, wherein the swipe screen interface enables the user to choose to re-send past scanned images to a same destination as previously sent or to choose to send those images to one or more other scan destinations.

7. The sheet scanner of claim 1, wherein the scan image is displayed on said touch screen display for review by the user.

8. The sheet scanner of claim 7, wherein the swipe screen interface further includes edit functions for selection by the user to edit the displayed scan image before the scan image is communicated to the selected scan destination.

9. The sheet scanner of claim 1, wherein the swipe screen interface displays the status of uploading or saving of the scan image on the touch screen display.

10. The sheet scanner of claim 1, wherein the memory further comprises instructions that when processed by the processor causes the processor to automatically manage the memory such that oldest saved images in the memory that have successfully been uploaded or saved to their selected scan destination are automatically deleted from the memory.

11. A method of scanning a document, comprising the steps of:
selecting a scan destination in remote computing services including cloud services for a document scanned by a sheet scanner by swiping a selection ribbon of icons of available scan destinations in the remote computing services including cloud services known to the sheet scanner for selection by a user on a swipe screen interface of a touch screen display of the sheet scanner between icons representing respective scan destinations and pressing an icon on the touch screen display to select a scan destination, wherein the selection ribbon includes at least one icon that, when selected, enables the user to add a new scan destination in the remote computing services including cloud services previously unknown to the sheet scanner for selection by entering via the touch screen display data representative of the new scan destination previously unknown to the sheet scanner;

scanning the document with the sheet scanner to generate a scan image;

selecting a scan setting icon on the selection ribbon of the swipe screen interface of the touch screen display for a scan setting to be adjusted by an operator of the sheet scanner, the selected scan setting icon including at least one of color mode, single sided scanning, double sided scanning, separate or combined mode, DPI resolution, and image format; and communicating the scan image to the selected scan destination via a wireless communications port of the sheet scanner.

12. The method of claim 11, wherein downloading a new scan destination comprises downloading data representative of the new scan destination into the sheet scanner from a remote server.

13. The method of claim 11, further comprising selecting an outbox icon on said selection ribbon of the swipe screen interface of the touch screen display and, upon selection of the outbox icon, entering a mode that enables viewing activity status and history of the sheet scanner and resending the scan image to the selected scan destination or to a new scan destination.

14. The method of claim 11, further comprising displaying the scan image on the touch screen display for review by the user.

15. The method of claim 14, further comprising selecting edit functions to edit the displayed scan image before the scan image is communicated to the selected scan destination.

16. The method of claim 11, wherein the scan image is communicated to the selected scan destination by email.

17. The sheet scanner of claim 1, wherein the wipe screen interface presents one icon at a time to the touch screen display.

18. The method of claim 11, further comprising presenting one icon at a time to the swipe screen interface of the touch screen display.

19. The method of claim 11, wherein the selected scan setting is saved separately in a memory and associated with separate scan destinations by each scan destination associating a memory ID value with a stored set of destination specific scan settings.

* * * * *